United States Patent [19]

Drent

[11] Patent Number: 4,786,714

[45] Date of Patent: Nov. 22, 1988

[54] CATALYTIC PROCESS FOR POLYMERIZING CARBON MONOXIDE AND OLEFIN(S) WITH NITROGEN BIDENTATE LIGAND

[75] Inventor: Eit Drent, Amsterdam, Netherlands

[73] Assignee: Shell Oil Company, Houston, Tex.

[21] Appl. No.: 935,431

[22] Filed: Nov. 26, 1986

[30] Foreign Application Priority Data

Nov. 29, 1985 [NL] Netherlands .......................... 8503305

[51] Int. Cl.$^4$ .............................................. C08G 67/02
[52] U.S. Cl. .................................... 528/392; 502/150; 502/159; 502/162
[58] Field of Search ........................................ 528/392

[56] References Cited

U.S. PATENT DOCUMENTS

| | | | |
|---|---|---|---|
| 2,495,285 | 1/1950 | Hoehn | 260/28.5 |
| 2,495,286 | 1/1950 | Brubaker | 260/63 |
| 2,577,208 | 12/1951 | Ludwigshafen et al. | 260/406 |
| 2,641,590 | 6/1953 | Little, Jr. | 260/63 |
| 3,448,140 | 6/1969 | Gamlen et al. | 260/471 |
| 3,689,460 | 9/1972 | Nozaki | 260/63 |
| 3,694,412 | 9/1972 | Nozaki | 260/63 |
| 3,780,140 | 12/1973 | Hammer | 525/185 |
| 3,835,123 | 9/1974 | Nozaki | 260/94.9 |
| 3,914,391 | 10/1975 | Nozaki | 423/364 |
| 3,984,388 | 10/1976 | Shryne | 260/63 |
| 4,070,532 | 1/1978 | Hammer | 526/11.2 |
| 4,076,911 | 2/1978 | Fenton | 526/11.1 |
| 4,290,961 | 9/1981 | Mestroni | 260/397 |
| 4,424,317 | 1/1984 | Serres | 525/539 |
| 4,474,978 | 10/1984 | Drent | 560/24 |
| 4,740,625 | 4/1988 | Drent | 528/392 |

FOREIGN PATENT DOCUMENTS

| | | |
|---|---|---|
| 834073 | 2/1970 | Canada . |
| 019483 | 11/1980 | European Pat. Off. . |
| 1219650 | 10/1984 | European Pat. Off. . |
| 181014 | 5/1986 | European Pat. Off. . |
| 2046968 | 9/1968 | Japan . |
| 74048406 | 3/1969 | Japan . |
| 1081304 | 8/1967 | United Kingdom . |
| 2058074 | 4/1981 | United Kingdom . |

OTHER PUBLICATIONS

Kirk-Othmer Encyclopedia of Chemical Technology, Second Edition, vol. 12, p. 132, 1967.
Encyclopedia of Polymer Science and Technology, 1968, vol. 9, 397–402.
J. Am. Chem. Soc. 1982, 104, 3520-2.
Organometallics, 1984, 3, 866–870.
Proc. Ind. Assoc. Cult. Sci., 1985, 68B, 1–5.
Chemtech, 1986, 1, 48–51.
Adv. Polym. Sci., 1986, 73-4, 125–44.
Polym. Lett., 1965, 3, 703–7.
Chim. Ind., 1971, 53, 939–40.
J. Mol. Catal. 1983, 18, 117–25.
J. Organomet Chem. 1985, 279, C5-C10.
Tetrahedron Lett. 1971, 26, 2409–2412.

*Primary Examiner*—Harold D. Anderson

[57] ABSTRACT

The invention relates to compositions that may be used as catalysts for the preparation of polymers of carbon monoxide and olefinically unsaturated hydrocarbons. The invention also relates to processes using the catalyst compositions of the invention to prepare said polymers. The processes comprise contacting the monomers in the presence of a catalyst obtained from the reaction of a Group VIII metal compound with a nitrogen bidentate ligand, and an anion of a non-hydrohalogenic acid having a pKa of less than 6.

40 Claims, No Drawings

CATALYTIC PROCESS FOR POLYMERIZING CARBON MONOXIDE AND OLEFIN(S) WITH NITROGEN BIDENTATE LIGAND

FIELD OF THE INVENTION

The invention relates to processes for the preparation of polymers of carbon monoxide and ethylene, and polymers of carbon monoxide, ethylene and at least one alkenically unsaturated hydrocarbon. The invention also relates to the catalyst compositions used in the processes of the invention to prepare said polymers.

BACKGROUND OF THE INVENTION

Polymers of carbon monoxide and olefins, such as ethylene, have been known and available in limited quantities for many years. For example, polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397-402. Kirk-Othmer Encyclopedia of Chemical Technology notes that utilities for polyketones include the use of polyketones alone or as additives in waxes and surface coating applications. The low molecular weight copolymers in particular may be used as intermediates for the production of plastics, as components in blends with other polymers (such as waes and greases) and as pour-point depressants for middle distillate petroleum fuel products. See, for example, U.S. Pat. Nos. 2,495,285, 2,577,208 and 2,641,590 and Canadian Pat. No. 834073, which disclose utility and use for low molecular weight polyketones. The higher molecular weight polymers have use and utility as disclosed in U.S. Pat. Nos. 2,495,286 and 4,076,911 as premium thermoplastics for fibers, films, injection molding, compressing molding or blowing applications.

It is known that polyketones may be prepared by contacting CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymer consist of units with the formula —CO—(C₂H₄)—. Such polymers can be prepared with the aid of, among others, phosphorus-, arsenic-, antimony-, or cyanogen-containing compounds of palladium, cobalt or nickel as catalysts.

High molecular weight linear polymers of carbon monoxide and ethylene in which monomer units occur in alternating order and which polymers consist of units of the formula

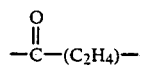

can be prepared by using Group VIII metal organic phosphine compounds as a catalyst, such as palladium organic phosphine compounds. For example U.K. Pat. No. 1,081,304, U.S. Pat. No. 3,689,460, and U.S. Pat. No. 3,694,412 disclose processes using palladium catalysts having monodentate alkyl phosphine ligands. Similar palladium catalysts having monodentate phosphine ligands are disclosed in the articles found in *J. Am. Chem Soc.* 1982, 104, 3520-2, *Organometallics* 1984, 3, 866-70, Proc. *Ind. Assoc. Cult. Sci.* 1985, 68B, 1-5 and *CHEMTECH* 1986, 1, 48-51. Europeanpatent application No. 121,965 discloses a process for polymerizing CO and alkenically unsaturated hydrocarbon using a Group VIII metal complex having bidentate phosphorous, arsenic or antimony ligands. Application of these catalysts to a monomer mixture which, in addition to carbon monoxide and ethylene, comprises at least one olefinically unsaturated hydrocarbon having the general formula $C_xH_y$, which hydrocarbon has fewer than 20 carbon atoms and contains an olefinically unsaturated —CH=CH— group, leads to the formation of polymers with units of the formula

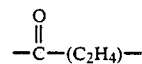

and units of the general formula

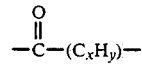

occurring randomly distributed within the polymer. The structure of the copolymers and "terpolymers" differs only in that in case of the "terpolymers" a units of

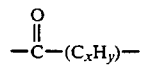

is encountered at some random places in the polymer instead of a unit of

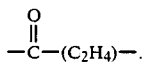

These polymers have excellent mechanical properties; especially, very high strength stiffness and impact resistance. However, the use of the Group VIII metal organic phosphine compounds as catalysts has the drawback that they are highly susceptible to oxidation. In the presence of air they are converted into phosphine oxides, which do not possess catalytic activity. Since generally the organic palladium phosphine compounds are very active catalysts, only small amounts are needed to carry out the polymerization. As a consequence, even traces of air will be sufficient for these catalysts to become deactivated. Therefore, complete freedom from air contact should be ensured during transport, storage and use of these catalysts.

SUMMARY OF THE INVENTION

Recently, new catalysts have been found which can be used, just as the above-mentioned organic palladium phosphine compounds, to prepare high molecular weight linear alternating polymers from mixtures of carbon monoxide with ethylene and optionally at least one olefinically unsaturated compound, but which catalysts are more resistant to oxidation than the phosphine compounds. The catalyst compositions which retain catalyst activity intact in the presence of air comprise (1) a compound of a Group VIII metal selected from the group consisting of palladium, cobalt and nickel,
(2) an anion of a non-hydrohalogenic acid having a pka less than 6,
(3) a nitrogen bidentate ligand of the general formula

wherein X and Y represent the same or different organic bridging groups, each bridging group having three or four atoms in the bridge wherein at least two atoms of each bridge are carbon atoms.

The patent application further relates to the use of these catalyst compositions in a process for the preparation of polymers of carbon monoxide with one or more olefinically unsaturated organic compounds as well as to polymers thus prepared and shaped objects consisting at least partly of said polymers.

DETAILED DESCRIPTION OF THE INVENTION

The preferred Group VIII metal compound present in the catalyst composition is a palladium compound. Very suitable are palladium salts of carboxylic acids and in particular palladium acetate. Examples of suitable acids with a pKa of less than 6 (determined in aqueous solution at 18° C.) are sulfuric acid, perchloric acid, sulfonic acids, such as methanesulfonic acid, trifluoromethanesulfonic acid and para-toluenesulfonic acid and carboxylic acids, such as trichloroacetic acid, difluoroacetic acid, trifluoroacetic acid, monochloroaceti acid, difluoropropionic acid, acetic acid, tartaric acid, 2,5-dihydroxybenzoic acid, hydrochloric acid, hydrofluoric acid and hydrobromic acid. Preferred are all acids with pKa of less than 4, acids with a pKa of less than 2 are even more preferred. The most preference is given to paratoluenesulfonic acid and trifluoroacetic acid. The preferred quantity of the anion of the acid with a pKa of less than 6 present in the catalyst compositions is from 0.5 to 200 and more preferred from 1.0 to 100 equivalents per gram atom of Group VIII metal.

The acid anion component present in the compositions can occur therein either in the form of an acid or in the form of a metal salt. Suitable metal salts are selected from the group consisting of Ni, Cu, Fe, Co, Mn and V salts. Preference is given to Ni, Cu, Fe and V salts. The Group VIII metal compound of the catalyst composition and the anion of a non-hydrohalogenic acid having a pKa less than 6 may occur combined in a single compound. This is the case, for example, when a palladium compound is used that is a palladium salt of a non-hydrohalogenic acid having a pKa less than 6.

Preferably, the nitrogen bidentate ligand used as component 3 is present in the catalyst compositions in a quantity of 0.5–200, and more preferably 1–50, mol per mol of Group VIII metal compound. In the nitrogen bidentate ligand the bridging groups X and Y are linked by the two carbon atoms shown in the general formula. In addition to this bond the bridging groups X and Y can be linked by a further bond, such as in 1,10-phenanthroline and compounds derived therefrom. If, in addition to the carbon atoms, the bridging groups X and Y contain further atoms in the bridge, these atoms are preferably nitrogen atoms. Further, preference is given to nitrogen bidentate ligands wherein the bridging groups X and Y are the same group. Examples of suitable nitrogen bidentate ligands are 2,2'-bipyridine and compounds derived therefrom, such as
4,4'-dimethyl-2,2'-bipyridine,
4,4'-dichloro-2,2'-bipyridine,
4,4'-dimethoxy-2,2'-bipyridine and
4,4'-dicarboxy-2,2'-bipyridine.

Further examples of suitable nitrogen bidentate ligands that may be mentioned are 1,10-phenanthroline and compounds derived therefrom, such as
5-chloro-1,10-phenanthroline,
4,7-diphenyl-1,10-phenanthroline,
4,7-dimethyl-1,10-phenanthroline,
2 9-dichloro-1,10-phenanthroline,
1,10-phenanthroline-5-sulfonic acid and
4,7-diphenyl-1,10-phenanthrolinedisulfonic acids.

Examples of other suitable nitrogen bidentate ligands are
2,2'-biquinoline,
2-(2-pyridyl)benzimidazole,
3-(2-pyridyl)-5,6-diphenyl-1,2,4-triazine and the monosodium salt of
3-(2-pyridyl)-5,6-diphenyl-1,2,4-triazine-p,p'-disulfonic acid.

Preferably, the nitrogen bidentate ligand present in the catalyst composition is a 2,2'-bipyridine which may be substituted or a 1,10-phenanthroline which also may be substituted.

Special preference is given to the compound 2,2'-bipyridine and 1,10-phenanthroline.

The catalyst compositions according to the invention may be used for preparing polymers of carbon monoxide and an olefinically unsaturated hydrocarbon. Most preferably the olefinically unsaturated hydrocarbon is ethylene. The catalyst compositions may be used as well for preparing polymers of carbon monoxide with ethylene and, in addition, at least one olefinically unsaturated hydrocarbon. The latter olefinically unsaturated hydrocarbons preferably have the general formula $CHR_1=CHR_2$ wherein the groups $R_1$ and $R_2$ together contain fewer than 18 carbon atoms and wherein $R_1$ is a hydrocarbon group and $R_2$ is selected from the group consisting of hydrogen and a hydrocarbon group. $R_1$ and $R_2$ may together form part of a cyclic structure, as in the monomers cyclopentene and cyclohexene. In so far as the groups $R_1$ and $R_2$ are hydrocarbon groups, preference is given to alkyl groups. Especially preferred are monomers in which $R_1$ is hydrogen and $R_2$ is an alkyl group and even more preferred $R_2$ is a methyl group. In the mixture to be polymerized the molar ratio of the olefinically unsaturated hydrocarbons relative to carbon monoxide is preferably 10:1–1:5 and more preferably 5:1–1:2.

The polymerization using the catalyst compositions according to the invention is preferably carried out in a liquid diluent. Very suitable liquid diluents are lower alcohols, such as methanol and ethanol. The quantities of catalyst composition used in the preparation of the polymers may vary within wide limits. Per mol of olefinically unsaturated hydrocarbon to be polymerized, a quantity of catalyst composition is used which preferably contains $10^{-7}-10^3$ and more preferably $10^{-6}-10^4$ gram atom of Group VIII metal. The preparation of the polymers by using the catalyst compositions according to the invention is preferably carried out at a temperature of 20°–200° C. and a pressure of 1–200 bar and more preferably at a temperature of 30°–150° C. and a pressure of 20–100 bar.

The invention will now be illustrated with the aid of the following examples.

EXAMPLE 1

A carbon monoxide/ethylene copolymer was prepared as follows. Into a magnetically stirred autoclave of 250 ml capacity a catalyst solution was introduced comprising 50 ml methanol, 0.1 mmol palladium acetate, 3 mmol 2,2'-bipyridine and 2 mmol para-toluenesulfonic acid. Carbon monoxide was introduced into the autoclave under pressure until a pressure of 20 bar was reached, followed by ethylene until a pressure of 60 bar was reached. Finally, the contents of the autoclave were heated to 100° C. After 5 hours the polymerization was stopped by cooling the reaction mixture down to room temperature and then releasing the pressure. The polymer was filtered off, washed with methanol and dried in vacuo at room temperature. The result was 1.5 g of copolymer.

EXAMPLE 2

A carbon monoxide/ethylene copolymer was prepared a follows. Into a magnetically stirred autoclave of 250 ml capacity a catalyst solution was introduced comprising 50 ml methanol, 0.5 mmol palladium acetate, 1 mmol 1,10-phenanthroline and 2 mmol para-toluenesulfonic acid.

Carbon monoxide was introduced into the autoclave under pressure until a pressure of 30 bar was reached, followed by ethylene until a pressure of 60 bar was reached. Finally, the contents of the autoclave were heated to 90° C. After 5 hours the polymerization was stopped by cooling down the reaction mixture to room temperature and subsequently releasing the pressure. The polymer was filtered off, washed with methanol and dried in vacuo at room temperature. The result was 3.7 g of copolymer.

EXAMPLE 3

A carbon monoxide/ethylene copolymer was prepared as follows. Into a magnetically stirred autoclave of 250 ml capacity a catalyst solution was introduced comprising 50 ml methanol, 0.1 mmol palladium acetate, 2 mmol 2,2'-bipyridine and 2 mmol copper paratosylate. Carbon monoxide was introduced into the autoclave under pressure until a pressure of 30 bar was reached, followed by ethylene until a pressure of 50 bar was reached. Finally, the contents of the autoclave were heated to 100° C. After 5 hours the polymerization was stopped by cooling the reaction mixture down to room temperature and then releasing the pressure. The polymer was filtered off, washed with methanol and dried in vacuo at room temperature. The result was 0.8 g of copolymer.

EXAMPLE 4

A carbon monoxide/ethylene copolymer was prepared as follows. Into a magnetically stirred autoclave of 250 ml capacity a catalyst solution was introduced comprising 50 ml methanol, 0.1 mmol palladium acetate, 3 mmol 4,4'-dicarboxy-2,2'-bipyridine and 2 mmol para-toluenesulphonic acid. Carbon monoxide was introduced into the autoclave under pressure until a pressure of 30 bar was reached, followed by ethylene until a pressure of 60 bar was reached. Finally, the contents of the autoclave were heated to 90° C. After 5 hours the polymerization was stopped by releasing the pressure. The polymer was filtered off, washed with methanol and dried in vacuo at room temperature. The result was 2.2 g of copolymer. With the aid of $^{13}$C-NMR analysis it was established that the carbon monoxide/ethylene copolymers prepared according to Examples 1–4 had a linear alternating structure and consisted of units of the formula $-CO-(C_2H_4)-$. The copolymers had a melting point of 257° C.

What is claimed is:

1. A process for preparing a polymer which comprises contacting carbon monoxide and an olefinically unsaturated hydrocarbon in the presence of a catalyst wherein the catalyst is obtained by reacting
   (1) a compound of a Group VIII metal selected from the group consisting of palladium, cobalt and nickel,
   (2) an anion of a non-hydrohalogenic acid having a pKa less than 6, and
   (3) a nitrogen bidentate ligand of the general formula

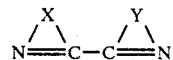

wherein X and Y represent the same or different organic bridging groups, each having a bridge containing three or four atoms, wherein at least two of the atoms in the bridge are carbon atoms, and under conditions suitable to prepare a polymer.

2. The process of claim 1 wherein the Group VIII metal compound is a palladium compound.

3. The process of claim 1 wherein the Group VIII metal compound is a palladium salt of a carboxylic acid.

4. The process of claim 1 wherein the Group VIII metal compound is palladium acetate.

5. The process of claim 1 wherein the anion of an acid having a pKa less than 6 is an anion of an acid selected from the group consisting of sulfonic acids having a pKa of less than 2 and carboxylic acids having a pKa of less than 2.

6. The process of claim 1 wherein the anion of an acid having a pKa of less than 6 is an anion of an acid selected from the group consisting of para-toluenesulfonic acid and trifluoroacetic acid.

7. The process of claim 1 wherein in the reaction to obtain the catalyst, the quantity of anion of an acid having a pKa of less than 6 is from about 0.5 to about 200 equivalents per gram atom of Group VIII metal.

8. The process of claim 1 wherein in the reaction to obtain the catalyst, the quantity of anion of an acid having a pKa of less than 6 is from about 1 to about 100 equivalents per gram atom of Group VIII metal.

9. The process of claim 1 wherein the anion of an acid having a pKa less than 6 is present as the salt of a metal selected from the group of metals consisting of nickel, copper, iron, cobalt, chromium, manganese and vanadium.

10. The process of claim 1 wherein the anion of an acid having a pKa less than 6 is present as the salt of a metal selected from the group of metals consisting of nickel, copper, iron, and vanadium.

11. The process of claim 1 wherein in the reaction to obtain the catalyst, the quantity of nitrogen bidentate ligand is from about 0.5 to about 200 mol per mol of Group VIII metal compound.

12. The process of claim 1 wherein in the reaction to obtain the catalyst, the quantity of nitrogen bidentate ligand is from about 1 to about 50 mol per mol of Group VIII metal compound.

13. The process of claim 1 wherein the organic bridging groups X and Y also contain nitrogen atoms.

14. The process of claim 1 wherein the organic bridging groups X and Y are the same groups.

15. The process of claim 1 wherein the nitrogen bidentate ligand is selected from the group consisting of substituted or unsubstituted 2,2'bipyridine, and substituted or unsubstituted 1,10-phenanthroline.

16. The process of claim 1 wherein the process is carried out by contacting the monomers with a catalyst in the presence of a liquid diluting agent.

17. The process of claim 16 wherein the liquid diluting agent is a lower alcohol.

18. The process of claim 17 wherein the liquid diluting agent is selected from the group consisting of methanol and ethanol.

19. The process of claim 1 wherein the quantity of catalyst is from about $10^{-1}$ to about $10^{-3}$ gram atom of Group VIII metal per mol of ethylene.

20. The process of claim 1 wherein the quantity of catalyst is from about $10^{-6}$ to about $10^{-4}$ gram atom of Group VIII metal per mol of ethylene.

21. The process of claim 1 wherein the molar ratio of the number of moles of ethylene relative to the number of moles of carbon monoxide is from about 10:1 to about 1:5.

22. The process of claim 1 wherein the molar ratio of the number of moles of ethylene relative to the number of moles of carbon monoxide is from about 5:1 to about 1:2.

23. The process of claim 1 wherein contacting temperature is from about 20° to about 200° C. and contacting pressure is from about 1 to about 200 bar.

24. The process of claim 1 wherein contacting temperature is from about 30° to about 150° C. and contacting pressure is from about 20 to about 100 bar.

25. The process of claim 1 wherein olefinically unsaturated hydrocarbon is ethylene.

26. The process of claim 1 wherein the monomer mixture from which the polymers are prepared comprises carbon monoxide, ethylene and at least one olefinically unsaturated hydrocarbon.

27. The process of claim 26 wherein olefinically unsaturated hydrocarbon has the general formula $CHR_1=CHR_2$, where $R_1$ is an alkyl group and $R_2$ is selected from the group consisting of hydrogen and an alkyl group, and where $R_1$ and $R_2$ together contain fewer than 18 carbon atoms.

28. The process of claim 27 wherein $R_1$ is hydrogen and $R_2$ is an alkyl group.

29. The process of claim 28 wherein $R_1$ is hydrogen and $R_2$ is an methyl group.

30. A process for preparing a linear alternating polymer of carbon monoxide and at least one olefinically unsaturated hydrocarbon which comprises contacting carbon monoxide and at least one olefinically unsaturated hydrocarbon in the presence of a catalyst obtained from (1) a palladium compound, (2) an anion of a non-hydrohalogenic acid having a pKa less than 6, and (3) a nitrogen bidentate ligand of the general formula

wherein X and Y represent the same or different organic bridging groups, each having a bridge containing three or four atoms, wherein at least two of the atoms in the bridge are carbon atoms, and under conditions suitable to prepare a linear alternating polymer.

31. The process of claim 30 wherein olefinically unsaturated hydrocarbon is ethylene.

32. The process of claim 30 wherein olefinically unsaturated hydrocarbon is ethylene and at least one olefinically unsaturated hydrocarbon having the general formula $CHR_1=CHR_2$, where $R_1$ is alkyl and $R_2$ is alkyl or hydrogen.

33. The process of claim 32 wherein $R_2$ is hydrogen.

34. The process of claim 32 wherein the palladium compound is a palladium salt of a carboxylic acid.

35. The process of claim 34 wherein the acid is selected from the group consisting of sulfonic acids having a pKa less than 6 and carboxylic acids having a pKa less than 6.

36. The process of claim 35 wherein the acid is selected from the group consisting of para-toluene sulfonic acid and trifluoroacetic acid.

37. The process of claim 35 wherein X and Y each contain nitrogen atoms.

38. The process of claim 35 wherein X and Y are the same.

39. The process of claim 35 wherein the nitrogen bidentate ligand is 2,2'-bipyridine.

40. The process of claim 35 wherein the nitrogen bidentate ligand is 1,10-phenanthroline.

* * * * *